United States Patent [19]

Smith

[11] Patent Number: 5,619,411

[45] Date of Patent: Apr. 8, 1997

[54] ENHANCED VERTICAL RESOLUTION PROCESSING OF DUAL-SPACED DENSITY TOOLS

[75] Inventor: Michael P. Smith, Houston, Tex.

[73] Assignee: Halliburton Company, Houston, Tex.

[21] Appl. No.: 348,561

[22] Filed: Dec. 2, 1994

[51] Int. Cl.$^6$ .............................. G06F 19/00; G01V 3/00
[52] U.S. Cl. .............................................................. 364/422
[58] Field of Search ...................................... 364/421, 422

[56] References Cited

U.S. PATENT DOCUMENTS

| | | |
|---|---|---|
| 4,535,625 | 8/1985 | Lyle, Jr. . |
| 4,760,252 | 7/1988 | Albats et al. . |
| 4,794,792 | 1/1989 | Flaum et al. . |
| 4,909,075 | 3/1990 | Flaum et al. . |
| 4,958,073 | 9/1990 | Becker et al. .................. 250/269.3 |
| 5,019,708 | 5/1991 | Flaum . |
| 5,227,972 | 7/1993 | Jacobson ............................ 364/422 |
| 5,282,133 | 1/1994 | Watson ............................... 364/422 |
| 5,350,925 | 9/1994 | Watson ............................... 364/422 |
| 5,377,105 | 12/1994 | Smith ................................. 364/422 |
| 5,506,769 | 4/1996 | Fu et al. ............................. 364/422 |
| 5,511,037 | 4/1996 | Randall et al. .................... 364/422 |

FOREIGN PATENT DOCUMENTS

| | | |
|---|---|---|
| 1281437 | 3/1991 | Canada . |
| 0267075 | 5/1988 | European Pat. Off. . |

OTHER PUBLICATIONS

Schultz, W.E. et al. "Applications of Digital Filtering Techniques to Nuclear Well Logs," SPWLA 22nd Annual Logging Symposium, Jun. 1981.

Flaum, C. et al. "Enhanced Vertical Resolution Processing of Dual Detector Gamma-Gamma Density Logs," SPWLA 28th Annual Logging Symposium, Jun. 1987.

Galford, J.E. et al. "Enhanced Resolution Processing of Compensated Neutron Logs," SPE 15541, Oct. 1986.

Flaum, C. et al. "Eliminating the Effect of Rugosity from Compensated Density Logs by Geometrical Response Matching," SPE 19612, Oct. 1989.

Mathis, G.L. et al. "Characterization of Vertical Resolution for PE and Density Logging," SPWLA 29th Annual Logging Symposium, Jun. 1988.

Petler, J.S., "Modelling the Spatial Response of a Compensated Density Tool," IEEE Transactions on Nuclear Science, vol. 37, No. 2, Apr. 1990 (presented at IEEE Meeting, San Francisco, Jan. 1990).

Jacobson, L.A., et al. "Resolution Enhancement of Nuclear Measurements Through Deconvolution," SPWLA 31st Annual Logging Symposium, Jun. 1990.

(List continued on next page.)

Primary Examiner—Donald E. McElheny, Jr.

[57] ABSTRACT

The method employs standard processing techniques in order to derive and maintain raw data as well as background corrected and shop calibrated data. Specific data from standard processing is used for the Enhanced Vertical Resolution (EVR) processing. The method uses corrected and calibrated data from standard processing. This data is filtered using improved standard processing material matching filters. Density correction factors $\Delta\bar{\rho}_{LONG}$ (or equivalently $\Delta\bar{\rho}_{SHORT}$) is calculated for the long and short detectors and used in further processing. $\Delta\bar{\rho}_{LONG}$ and $\Delta\bar{\rho}_{SHORT}$ are used to calculate the standard calibrated compensated density $\rho$. Enhanced processing begins with the iterative deconvolution and filtering (or smoothing) of $\Delta\bar{\rho}_{SHORT}$. The background corrected and shop calibrated short density data, calculated during standard processing, is materially matched using an improved EVR filter. Finally, an enhanced calibrated borehole compensated density $\hat{\rho}_B$ is calculated. The use of the same processing methods and a strict enforcement of material matching, both for the standard and enhanced processing, insures that neither short nor long detector count rates are overemphasized and that shop calibrations and borehole compensation are accurately maintained.

33 Claims, 10 Drawing Sheets

OTHER PUBLICATIONS

Lyle, W.D. et al. "Deconvolution of Well Log Data, An Innovations Approach," SPWLA 27th Annual Logging Symposium, Jun. 1986.

Gartner, M.L., "A New Resolution Enhancement Method for Neutron Porosity Tools," IEEE Transactions on Nuclear Science, vol. 36, No. 1, Feb. 1989.

Quirein, J.A. et al. "Improved Resolution of Nuclear Well Logs," Paper A, SAID 12th International Formation Evaluation Symposium Transactions, Oct. 1989.

Smith, M.P., "Enhanced Vertical Resolution Processing of Dual-Spaced Neutron and Density Tools Using Standard Shop Calibration and Borehole Compensation Procedures," SPWLA 31st Annual Logging Symposium, Jun. 1990.

Looyestijn, W.J., "Deconvolution of Petrophysical Logs: Applications and Limitations," SPWLA 23rd Annual Logging Symposium, Jul. 1982.

Jacobson, L.A., "A Matched Filter Data Smoothing Algorithm," IEEE Transactions on Nuclear Science, vo. 36, No. 1, 1989.

Torres, D. et al. "Real Time Frequency Domain Filtering Maximizing Vertical Resolution While Minimizing Noise," SPWLA 29th Annual Logging Symposium, Jun. 1988.

Picton, D.J. et al, "Enhanced Vertical Resolution Analysis of Density Tool Data in Rugose Holes (Part I)," 15th European Formation Evaluation Symposium, May 1993.

Jansson, P.A., *Deconvolution with Appliations in Spectroscopy*, Chapters 4–5, Academic Press, Inc., Orlando 1984.

Elkington, P.A.S., "Vertical Enhancement by Combination and Transformation of Associated Responses," SPWLA 31st Annual Logging Symposium, Jun., 1990.

Kerford, S.J., "Application of Time–Series Analysis to Wireline Logs."

Dyos, C.J., "Inversion of Well Log Data by the Method of Maximum Entropy," Tenth European Formation Evaluation Symposium.

Fu, Chu–Chiu, "Deconvolution and Windowing – A Technique to Improve the Vertical Resolution of Nuclear Tools."

ENHANCED VERTICAL RESOLUTION PROCESSING OF DUAL-SPACED DENSITY TOOLS

FIELD OF THE INVENTION

This invention relates generally to the art of gamma-gamma well logging, and more particularly to a method of improving the vertical resolution of dual spaced gamma-gamma density tools by improving the vertical resolution of the long-spaced density detector using its specific vertical response function. The method has particular benefit with gamma-gamma tools such as the spectral density log (SDL). In one proposed implementation of the invention, the resolution is enhanced, in part, through use of the Van Cittert deconvolution technique.

As is detailed below, the borehole compensation accomplished by standard spine-and-ribs methodology, and the standard shop calibration procedures, are retained. This allows maintenance of accuracy in density/porosity measurements. Although the focus of the method of the invention may appear to be on the improvement of the vertical resolution of the long detector, the short detector (and its associated count rates) are also used, so that the resulting focused measurements of the long detector remain borehole compensated.

Density logging techniques using gamma-gamma detectors for making measurements on the subsurface formations surrounding a borehole are well known in the art. See, for example, my prior application Ser. No. 08/158,194 filed Nov. 24, 1993, U.S. Pat. No. 5,377,105, which is a continuation of application Ser. No. 07/684,404 filed Apr. 12, 1991, abandoned, entitled "Enhanced Vertical Resolution Processing of Dual-Spaced Neutron and Density Tools" (hereinafter referred to as the *Neutron Logging Application*), which are incorporated herein by this reference. Density logging tools generally include a source of gamma rays and at least two gamma ray detectors spaced at different distances from the source. In practice, density logging involves the lowering of the density logging tool into the well borehole. The source irradiates the formations surrounding the tool with gamma rays. The detectors in the tool then sense some of the gamma rays after they have collided several times with atoms of the formation. Density logs are generated from the detected gamma rays. Density logs are used primarily for determining the density of the formations encountered by the tool.

DESCRIPTION OF THE PRIOR ART

In prior art density logging tool data processing, standard processing used a heavily filtered short detector count rate, and a more lightly filtered long detector count rate, to provide a borehole compensated, and rugosity compensated, density measurement through the use of both detectors and count rates. In the prior art enhanced processing, the short detector could be resolved to approximately 5 or 6 inches. However, its count rates were affected by borehole roughness—pits, gouges, etc.—in the region immediately opposite the tool. Prior art enhanced processing does not provide accurate results when changes in the borehole are not related to formation changes.

For example, in certain prior art methods, the measurements from the short detector are used directly, that is, not in combination with the long detector measurements. This methodology requires the acceptance of the assumption that any changes in the count rates of the short detector are always due to formation changes, that is, changes in the type of formation as opposed to changes in the structure of the borehole. Borehole structural changes can be caused by formations that either absorb water from the borehole, or desorb water into the borehole, or from geothermal stresses that cause the borehole to elongate and become elliptical. In these prior art processing techniques, when the density logging tool would encounter imperfect borehole conditions, the short detector count rates would improperly indicate a change from one formation type to another. Such techniques obviously led to inaccuracies.

Another problem with certain prior art methods is the modification of standard shop calibrations to analyze small portions of the borehole. These prior art methods first calculate a bulk density measurement for a relatively large area (approximately three feet) and then use this bulk density measurement to modify the "standard" shop calibration of the short detector so that the count rates of the short detector alone are proportionate to this same bulk density measurement. This modified shop calibration constant is then used to analyze small (3 to 5 inch) portions of the borehole—the very same small portions that were originally used to figure the bulk density which was then used to modify the shop calibration "constant". This circular methodology overemphasizes the accuracy and importance of the count rates of the short detector. Thus, the calibration constant of the short detector is forced, using bulk density measurements, to result in equality of bulk density measurements and short detector measurements. The new "constant" is then used to analyze specific formations. Concomitantly, these prior art methods deemphasize the accuracy and importance of the count rates of the long detector.

SUMMARY OF THE INVENTION

The method of the present invention solves these and other problems of the prior art by using both short and long detectors to enhance the vertical resolution of the density logging tool. The method of the invention employs standard processing techniques in order to derive and maintain raw data as well as background corrected and shop calibrated data. Specific data from standard processing is then used for the Enhanced Vertical Resolution (EVR) processing.

The corrected and calibrated data from standard processing is filtered using improved short and long material matching filters. From this material matched data, density corrections $\Delta \bar{\rho}_{LONG}$ and $\Delta \bar{\rho}_{SHORT}$ are calculated for the long and short detectors and used in further processing. A $\bar{\rho}_{LONG}$ (or equivalently, $\Delta \bar{\rho}_{SHORT}$) is used to calculate the standard calibrated compensated density $\bar{\rho}$. Enhanced processing begins with the iterative deconvolution and filtering (or smoothing) of the curve of $\Delta \bar{\rho}_{SHORT}$, and ends with enhanced correction $\Delta \hat{\rho}_{SHORT}$. The background corrected and shop calibrated short density data, calculated during standard processing, is then materially matched to $\Delta \hat{\rho}_{SHORT}$ using an improved EVR filter. Finally, an enhanced calibrated borehole compensated density $\hat{\rho}_B$ is calculated. The use of the same data, processing algorithms, and shop calibration constants, plus a strict enforcement of material matching for both the standard and EVR processing, all insure that neither the short nor the long detector count rates are overemphasized and that the borehole compensation remains intact as the vertical resolution is enhanced.

DETAILED DESCRIPTION OF THE PREFERRED EMBODIMENT

Standard preprocessing refers to operations performed on logging data before standard bulk density, borehole compensation, porosity computations, etc. are performed; important examples include time-to-depth basis conversion, depth alignment, material matching, background correcting, and application of the current shop calibrations.

Figure 1:
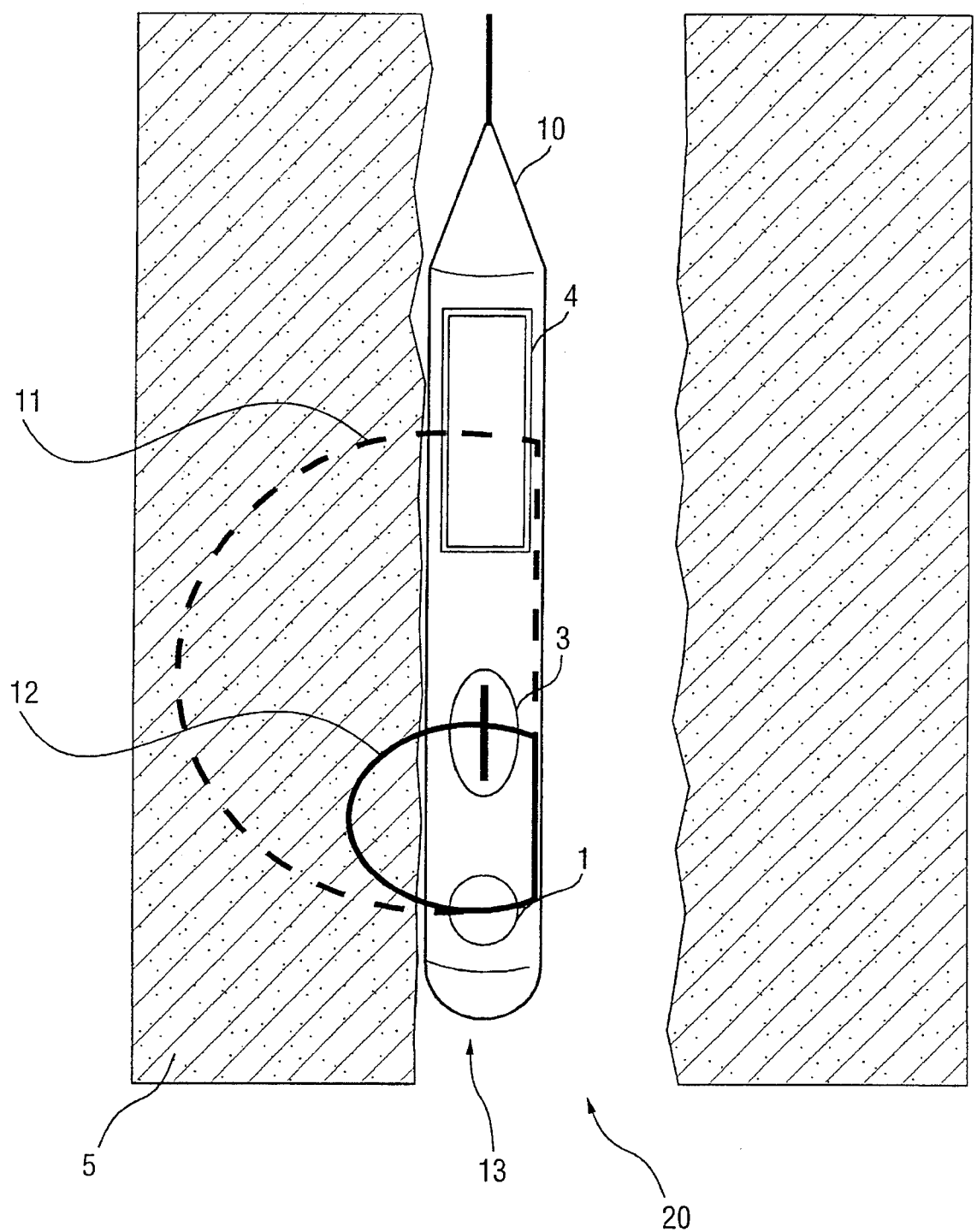
FIG. 1 schematically depicts a sonde supported in an uncased well borehole and illustrates short and long response volumes detected by the short and long detectors.

FIG. 1 shows (in schematic fashion) a dual-spaced density logging tool 10 having a gamma ray source 1, a short detector 3 and a long detector 4, in a borehole 20. Associated with the short detector 3 is a short detector response volume 12. Likewise, associated with the long detector 4 is a long detector response volume 11. These respective response volumes 11 and 12 are shown for one instant of time in which the logging tool 10 is at a fixed position 13 in the borehole 20. As the gamma rays leave the source 1 in the tool 10 and diffuse in the formation 5 and borehole region 20, they sample the materials between the source and each detector. A large portion of the measured short and long count rates is determined by the borehole 20 and formation 5 contained within the response volumes 11 and 12. The long and short response volumes 11 and 12 are not equal in size and each may contain materials not found within the other. The instrumentation incorporated in the tool 10 and short and long detectors 3 and 4 converts all the instantaneous count rates from a time basis to a depth basis at a fixed sample rate of 2 to 10 times per foot, typically by a known and simple averaging process. As discussed herein, a sample rate of four per foot, or every three inches is assumed.

However, the invention of the methods discussed and claimed herein is not limited to particular sample rates, response volumes, or other obviously modifiable variables associated with the equipment.

Figure 2:
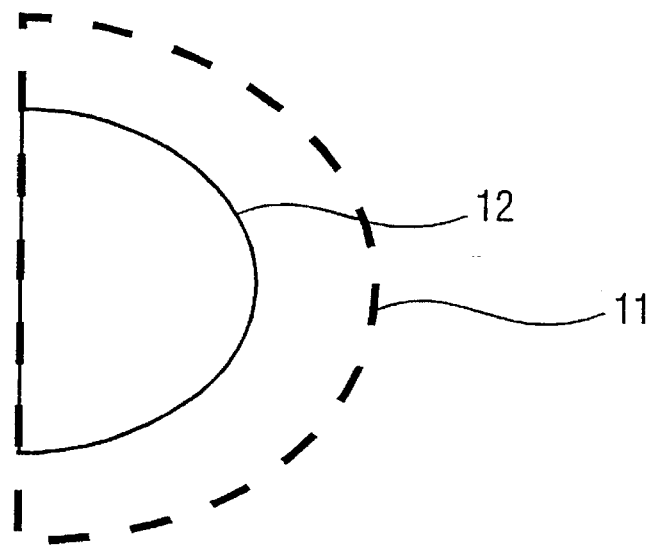
FIG. 2 schematically depicts the short and long response volumes after alignment whereby shifting occurs in handling of the data.
Figure 3:
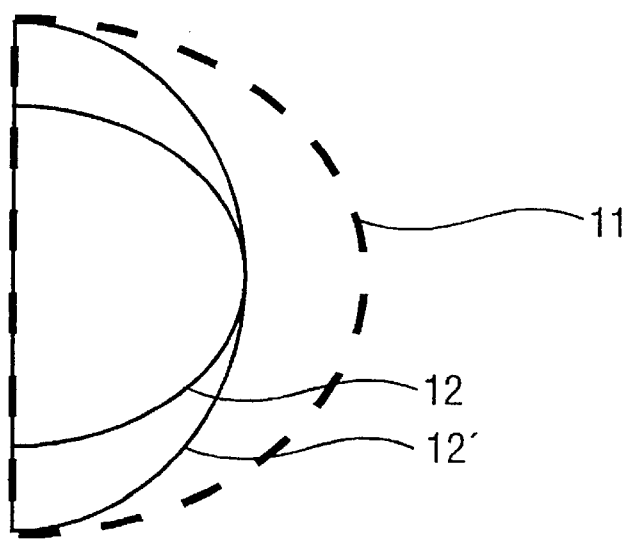
FIG. 3 depicts the short and long response volumes of FIG. 2 with the short volume smoothed so that both volumes investigate the same vertical extent of formation (material matching).

FIGS. 2 and 3 illustrate two important standard preprocessing operations, namely depth alignment and material matching of the density short and long count rates. These operations insure that both detectors 3 and 4 sense the same vertical extent of formation material 5 before any additional processing is performed. In these views, the short and long count rates are referred to a fixed (imaginary) measure point 13 called the tool measure point. These two operations are basic for both standard and enhanced processing of dual-spaced density logging tools. However, because of the differences in resolution involved in standard and EVR processing, different filters and techniques are utilized.

Figure 6:
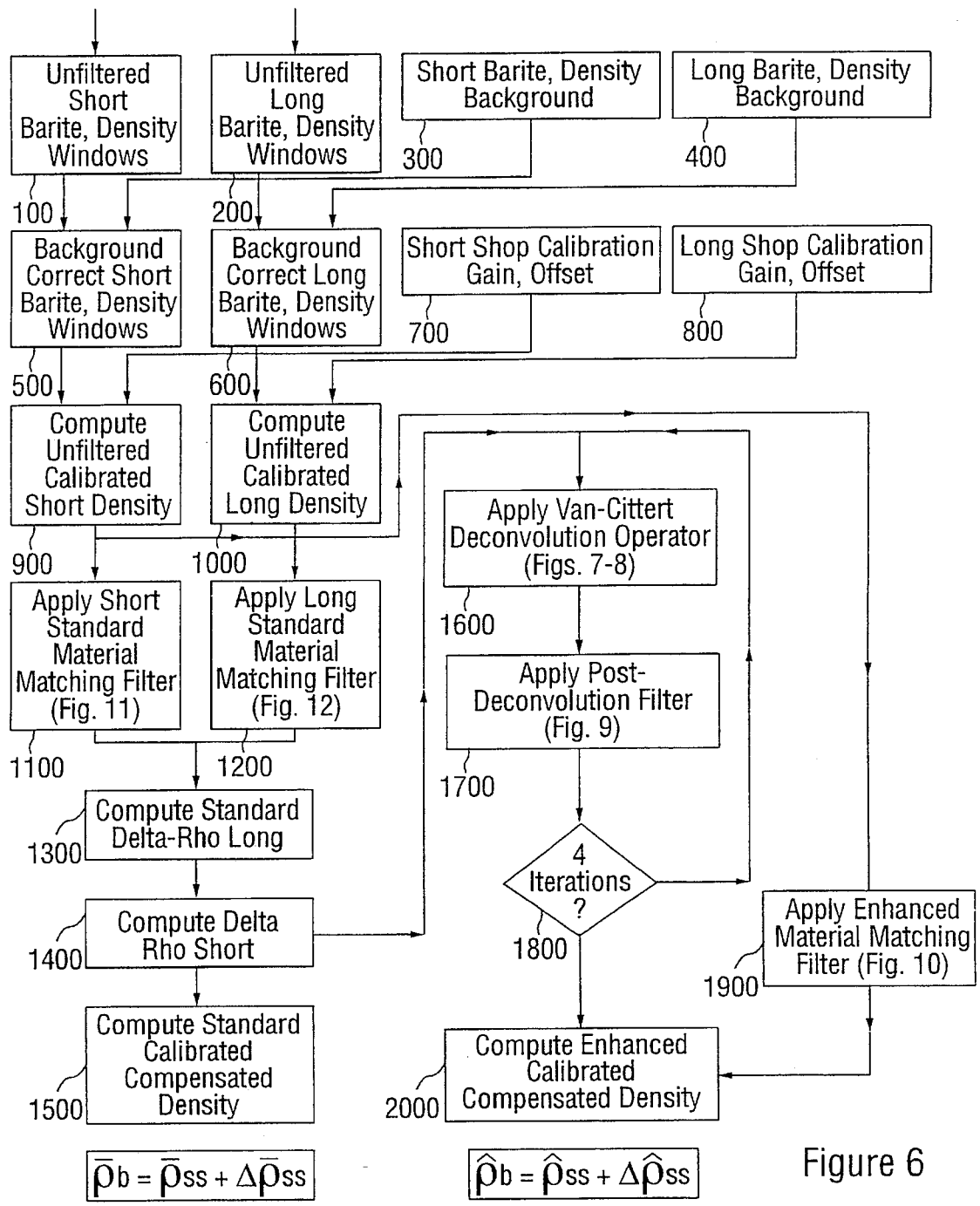
FIG. 6 is a flow chart showing both standard and enhanced vertical processing for density logging tools.

FIG. 6 shows, in flow chart form, the steps involved in both standard processing and enhanced processing for density logging tools. The standard processing, which is essentially the well known spine-and-ribs processing, is primarily shown on the left hand side of FIG. 6 and includes computation of $\Delta\bar{\rho}_{SHORT}$. Standard processing involves steps 100 through 1500 and results in the computation of $\Delta\bar{\rho}_B$, which is a two or three foot standard compensated value. The right hand side of FIG. 6 represents the enhanced processing and results in the computation of $\hat{\rho}_B$, which has a higher vertical resolution than $\bar{\rho}_B$. $\rho_B$ represents a bulk density. In the method of the invention, it is necessary to perform the standard processing in order to later perform the enhanced vertical processing via $\Delta\bar{\rho}_{SHORT}$. Enhanced processing involves, in addition to standard processing, steps 1600 through 2000.

Standard processing typically involves a measuring process that occurs every three inches and the analysis of various energy intervals or windows. Two windows that are used in standard processing, and which are also properly used for the EVR processing of the present invention, are unfiltered barite and density windows. These windows represent certain regions of measurement by the logging tool having definite energies in kilovolts of detected gamma rays. The barite and density windows are chosen because they have a high sensitivity to formation density.

Referring again to FIG. 6, the initial step involved in standard processing is shown in blocks 100 and 200. In this step, the logging tool 10 measures, and processing software then calculates from raw data, unfiltered barite and density window count rates for the short and long detectors 3 and 4. These count rates have been depth aligned. Blocks 300 and 400, also part of standard processing, contain shop calibrated background count rates that are used to perform background correction on the unfiltered count rates measured in the steps represented by blocks 100 and 200; these steps are 500 and 600. This process modifies the actually measured count rates according to specific information and qualities of the tool 10 and the detectors 3 and 4, as represented by blocks 300 and 400. Because each tool 10 and sets of detectors 3 and 4 are different, this background information varies from tool to tool and necessitates steps 500 and 600. The background count rates could arise, for example, if a small fixed source within each detector were used to gain stabilize the short- and long-spaced count rate pulse amplitudes.

Boxes 700 and 800 contain the actual short- and long-spaced shop calibration constants that convert count rates into density values. Steps 900 and 1000 compute unfiltered, calibrated short and long densities using the outputs of steps 500 and 600 and the gains and offsets of 700 and 800. The resulting short and long densities have been corrected for background and have been shop calibrated. However, no filtering has yet been performed. At this point, the short count rate has a very high resolution, but it is still strongly affected by borehole rugosity, borehole fluid, mud cake and standoff. The corrected, but unfiltered short density count rate data from step 900 is later used in the EVR processing.

Filtering, in the logging context, means applying simple operators (block, triangular, gaussian, or the like) to an interval of data in order to improve repeatability and/or to achieve material matching between short and long measurements in dual spaced density measurements. The individual elements of these simple filters are positive and always add up to one (1.0). Such filters are typically generally symmetrical about their center point. Also, these filters virtually always degrade vertical resolution and do not substantially move bed boundaries or bed peaks and valleys. Historically, the actual frequency response of such simple filters was not a primary consideration in well logging. However, there is now increasing interest in tailoring logging data to reject, or eliminate, certain kinds of noise or anomalies. This interest is exemplified in the use of band pass and low pass filters.

Figure 11:
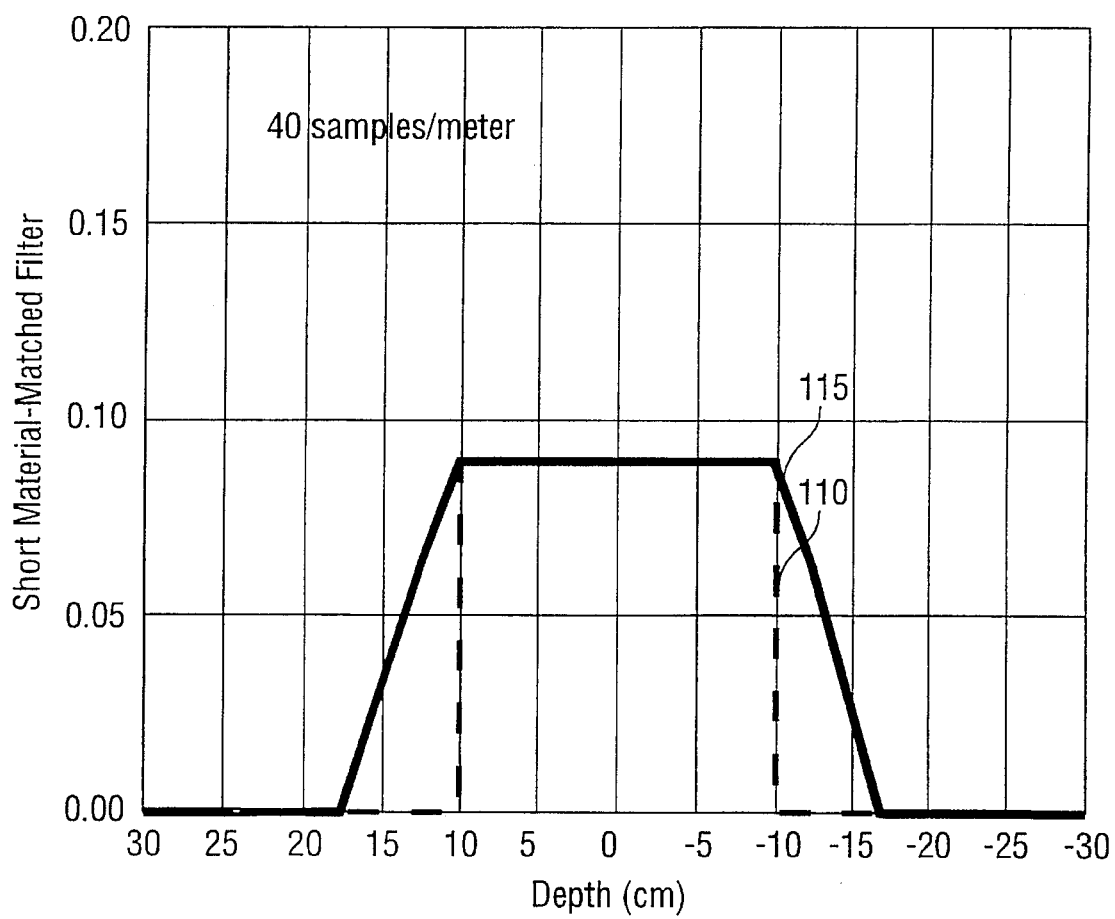
FIG. 11 is another exemplary filter for use on short detector measurements for material matching during standard and enhanced processing.
Figure 12:
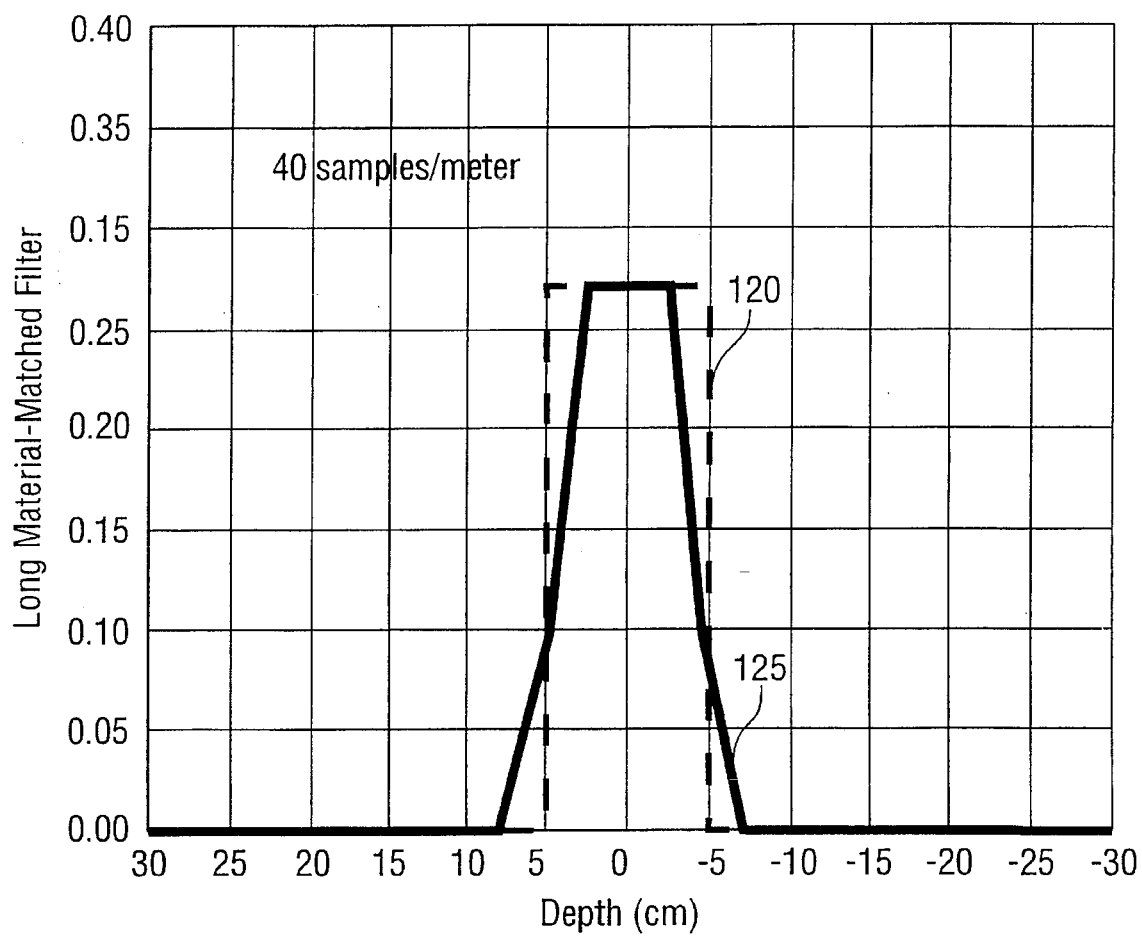
FIG. 12 is an exemplary filter for use on long detector measurements for material matching during standard and enhanced processing.

Steps 1100 and 1200 perform filtering on the standard data to achieve material matching of the measurements taken by the short and long detectors 3 and 4. The material matching operation (FIG. 3) smooths, or smears, the short detector response volume 12 so that it matches the long detector response volume 11 primarily in vertical extent. Thus, FIG. 3 shows a modified short volume 12' which is shaped to have the common diameter vertically matching that of long volume 11. This operation is vital to obtain proper borehole compensation through the use of two detectors, thereby minimizing short detector borehole rugosity effects, and also achieving accurate results at bed boundaries since the failure to do so will cause unwanted horns or extra beds to appear. These extra beds can be an insidious problem since they may be repeatably found on density logs, and yet they may not be real. In the past, simple block filters have been used to smear the short count rate to match the long count rate. Typical prior art block filters are also shown in FIGS. 11 and 12 with dashed lines 110 and 120. As is well known in the art, the exact amount of smearing of the short detector response for density tools using block filters (or more complex filters) must be verified experimentally, using test tank and well logging data. This smearing depends on acquisition sample rates; source to detector spacings; and depending on the detector, formation porosity. Material matching of dual spaced detector logging tools thus degrades the short detector vertical resolution, this despite the fact that the short detector has much better vertical resolution and typically much higher count rates and hence better statistical precision and log repeatability than the long detector of the tool. However, excellent rejection of borehole rugosity (ie. standoff) is thereby achieved.

Figure 4:
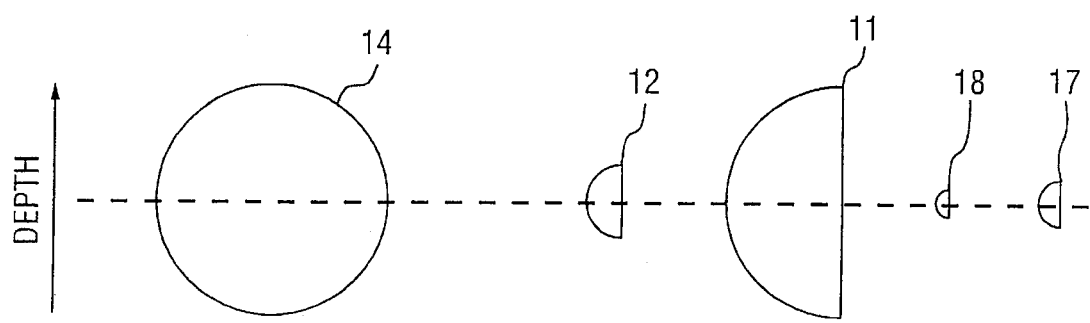
FIG. 4 depicts different size response volumes for different investigative measurements supported in a common sonde, at a single depth sample in the borehole.

FIG. 4 of the drawings shows representative response volumes for typical short- and long-spaced count rates from a density logging tool. These volumes have been depth aligned to correspond to the measuring point 13 of the sonde 10 shown in FIG. 1. In other words, the particular volumes represented in FIG. 4 are aligned with respect to their different locations along the tool body length, but they still show a disparity resulting from differences in response volumes. The numeral 11 identifies a long detector barite or density window response volume. That volume is, in part, defined by the size of the long detector and its spacing relative to the source in the tool 10. That volume can be reduced in size by moving the long detector closer to the source, but this involves a trade off which is not necessarily advantageous. If the long detector is moved further from the source, the more remote portions of the volume 11 will experience a reduced count rate and the data will have less repeatability. That also involves another trade off. Accordingly, with many factors involved in trade offs, the volume 11 is first defined and is, in large part, a function of the geometry of the tool and the distance between the source and the long detector.

The short detector density response volume 12 is also shown in FIG. 4. It also is, in part, dependent on the spacing of the short detector relative to the source; source and short detector collimation are also critical. Because the detector is closer to the source, the flux density is much higher. This also, however, involves certain trade offs which ultimately define the volume 12. The short and long detector sizes and spacings are chosen to optimize the measurement of formation density and to minimize variations in borehole conditions such as diameter and rugosity and variations on tool standoff. For completeness, FIG. 4 also shows response volumes 17 and 18 for the photoelectric (Pe) measurements provided by the dual-spaced spectral density tool using other window data especially the lithology window. The short-spaced Pe information is capable of very high resolution. For comparison, the natural gamma ray response volume 14 is also shown in FIG. 4. It is more symmetrical because its detector (located well away from the density detectors) is not collimated or shielded. The density response volumes are not symmetrical, showing that collimation/shielding achieves some focusing of the measurements away from the borehole into the formation. The natural gamma ray and long density measurements have similar vertical extents.

Assume, for purposes of description, that the volume 11 has a vertical extent of 12 inches. It is then necessary to filter the data for the volume 12 so that the volume 12' also has a vertical extent, as shown in FIG. 3, which matches the volume 11 (12 inches). If this is done, then the volumes 11 and 12' are derived from the same vertical extent of formation 5 and represent the same volume of formation materials, provided that the formations are horizontally uniform. The corresponding count rates are said to be materially matched. When the detectors detect the same vertical interval, comparisons then can be made of the respective data, using spline and ribs processing (or other types of processing).

It will be observed that the volumes 11 and 12 are inherently different in size. Not only that, there is an additional volume of note, namely the gamma radiation material volume 14. It has a different volumetric extent also. While the sonde 10 may support only a single tool, the normal construction is to install multiple tools within a common tool body. The sonde 10 therefore has numerous tools in it. Another tool is the dual-spaced neutron detector system. A third type of tool typically included is the dual-spaced spectral density logging tool. Pe measurements, with much smaller volumes 17 and 18, are developed from other density tool windows for the short- and long-spaced detectors (lithology windows).

In a typical tool construction, response volumes such as 11, 12, 14, 17 and 18 may vary from a maximum size of about twenty-four inches for the long neutron detector response volume to the volume 18 which might be as small as two to three (2–3) inches. Usually, three different types of tools are supported in the sonde 10 including the neutron logging tool, the natural gamma radiation detector and the spectral density logging tool. They are all housed or positioned in the common sonde 10 and the data obtained by the three respective tools are shifted to a fixed measuring point 13 to achieve alignment so that the data from a particular strata can be matched against other measurements for that same strata.

Figure 5:
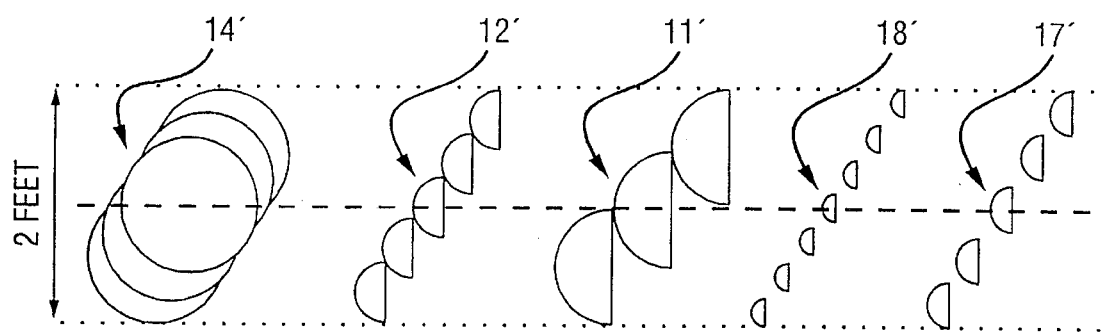
FIG. 5 is a view similar to FIG. 4 but with more depths, depicting overlapping response volumes corresponding to the smoothing/filtering done for material matching for several logging tools.

It is often important to insure that these measurements are simultaneously material-matched for all three logging tools creating logs of the borehole so all measurements for all tools respond to the same vertical formation extent. In this case, it becomes necessary to smooth the gamma ray detector and the spectral density detector measurements to match the assumed twenty-four inch vertical extent of the long detector neutron measurement. FIG. 5 shows how different vertical response intervals are dealt with so that they can be brought to a common vertical extent. A material match is accomplished. Given the tool geometry which suggests a minimum vertical response volume of about two feet (the response volume for the long neutron detector), the volume 12 is smoothed with a five point rectangular filter to achieve a vertical extent of 2 feet. In like fashion, this results in effective response volumes 14', 17' and 18'. This requires conversion of a sequence of data from each tool so that all data is summed through smoothing filters to thereby yield the vertical extent necessary. These smearing or smoothing filters for the density tool are shown in FIGS. 11 and 12.

Material matching requires dealing with sequences of data for each channel/detector. Using the natural gamma ray as an example, the measurements $14_1, 14_2, 14_3, \ldots 14_N$ where N is a whole number integer describing the sequence of gamma radiation logging data. Each datum is obtained as the tool moves along the borehole; each datum involves a different formation volume as the tool 10 moves. For a given tool's measurements, once the depth-alignement operation (FIG. 2) is completed, the application of filters, such as set forth in FIGS. 11 and 12, reconcile these differences in formation volumes. The application of these filters to the logging data in order to material match is a well known method and involves the multiplication of the count rates at certain vertical positions times the corresponding filter value, and the summation of these values for all indicated vertical positions.

These compatible measurements (the short and long outputs) are then available for application of the shop calibrations, described above, and for computation of variables as bulk density and porosity. Compatible filtering insures the accuracy of these procedures and eliminates spurious beds or artifacts from being produced on logs and insures accurate borehole compensation procedures. Compatible gamma ray, neutron, and density measurements, when input to modeling software for reservoir volumetric analyses, insure the accuracy of these analyses; false shows for gas and spurious lithology changes are minimized or eliminated. Compatible short and long measurements also insure the integrity of the shop calibration procedures: in the design of an accurate shop calibration, considerable care is exercised in making certain that the calibration media are homogeneous so both counters sense the same material.

As discussed above, material matching is a method of manipulating the data and count rates of the detectors so that both the short detector and the long detector are investigating the same extent of rock vertically. This is especially vital for recognition of thin bed formations. Material matching also allows for accurate differentiation of porosity changes among formations of the same type. If material matching is not performed, extra beds or horns will appear in the log. Steps 1100 and 1200 apply a standard material matching method that is well known. However, as shown in FIGS. 11 and 12, the filters used are improved over prior art filters:

they improve repeatability because they are less sensitive to statistical variations than previous filters. Thus, in FIG. 11, new filter 115 has better immunity to statistical noise than the old rectangular filter 110; similarly in FIG. 12, new filter 125 is superior to old filter 120. Both the old and new filters are good material matching filters.

One adverse affect of material matching is the loss of potentially better resolution of the short detector because this filtering is so heavy. Such heavy filtering is necessary because the short detector measures in much finer detail than the long detector and is more sensitive to borehole effects. Through filtering, the short detector responses are spread out or smeared to generally match those of the long detector. See FIG. 3. However, this smearing, or averaging, does result in better borehole compensation because both detectors sense the same borehole and formation factors.

More detail for step 1100 is shown in FIG. 11. FIG. 11 shows a standard short detector material matching filter in dashed lines 110, and an improved filter in solid lines 115. The X-axis of FIG. 11 shows the distance of the measurement of the logging data away from the current position of the short detector. In order to apply the filter, the method of standard processing multiplies the count rate obtained by the short detector when the short detector was at the corresponding vertical position, times the corresponding number found on the Y-axis. These results are then summed to obtain the filtered count rate for the present position of the short detector. The filter shown in FIG. 11 is actually a minor modification to prior art filters. Prior art filters did not have the sloped portion of increase and decrease. Prior art filters ascended and descended in a strictly vertical manner and tended to magnify statistical fluctuations in the data far removed from the depth=0 center point.

The filter for the long detector referred in step 1200 is shown in FIG. 12. A typical prior art filter is shown in dashed lines 120. The improved filter is shown in solid lines 125. Similar computations are used with respect to this filter as were used with respect to the filter in FIG. 11. Similarly, the FIG. 12 filter has been modified and improved in the same fashion as the filter in FIG. 11. As can be seen in FIG. 11 and 12, substantially fewer long detector logging measurement data are needed for material matching than with the short detector. This can be seen by examining the amount of vertical formation that has a non-zero value on the filters. For the short detector, preferably approximately 35 centimeters of measurements are used, as supposed to only preferably approximately 15 centimeters for the long detector. The filters (FIGS. 11 and 12) are determined by test data, rate of sampling, and logging data.

Step 1300 in FIG. 6 involves the standard computation of $\Delta \bar{\rho}_{LONG}$, as is well known to those of ordinary skill in the art. In this step the actual borehole compensation occurs. $\Delta \bar{\rho}_{LONG}$ is the classical density correction for the long detector. That is $\Delta \bar{\rho}_{LONG}$, when added to $\bar{\rho}_{LONG}$, the borehole compensated density as measured by the long detector, results in $\bar{\rho}_B$ which is the bulk density measurement.

In step 1400, the method of standard processing computes $\Delta \bar{\rho}_{SHORT}$. $\Delta \bar{\rho}_{SHORT}$ is a heavily averaged and filtered number that, when added to $\bar{\rho}_{SHORT}$, also results in $\bar{\rho}_B$, or bulk density. $\Delta \bar{\rho}_{SHORT}$ equals $\bar{\rho}_{SHORT}$ minus $\bar{\rho}_{SHORT}$ plus $\Delta \bar{\rho}_{LONG}$, and when added to $\bar{\rho}_{SHORT}$ equals $\bar{\rho}_B$. The curve representing $\Delta \bar{\rho}_{SHORT}$ is deconvolved in the enhanced EVR processing. Step 1500 is the culmination of standard processing that results in computation of the calibrated compensated density, or $\bar{\rho}_B$. $\Delta \bar{\rho}_{SHORT}$ is the bridge between standard and enhanced processing.

The previous material matching discussions have referred almost exclusively to standard processing of dual-spaced density data (and gamma ray and dual-spaced neutron data). Material matching of short and long detectors provides accurate borehole compensation and shop calibration methods. Material matching can, and must, be retained, for enhanced processing: it is elevated in importance for the accurate delineation of thin beds and the elimination of spurious thin beds due to mismatching.

FIGS. 4 and 5 reveal at least two important aspects of enhanced vertical resolution processing of dual-spaced density logging tools. First, if it is desired to take full advantage of the resolution available to the density measurements, simultaneous material matching over the gamma ray, neutron, and density measurements must be discarded. The gamma ray and neutron measurements are presently much coarser than the density measurements. As a result, issues related to vertical compatability of shale volume, neutron porosity, and density measurements needed for reservoir volumetric analyses are deferred to a later point in such calculations. Second, in order to retain compatability of the short and long density measurements, it is the vertical resolution of the long density measurements that must be improved since they are much coarser than the short measurements. This is achieved by deconvolution of measurements compatible with the long detector measurements.

Step 1600 is the beginning of the enhanced vertical processing for the density logging tool. In step 1600 the Van Cittert deconvolution operator is applied to the curve of $\Delta\bar{\rho}_{SHORT}$, which was calculated in step 1400.

Deconvolution is a digital/mathematical operation applied to an interval of logging data that improves vertical resolution, even beyond that obtainable with unfiltered data recorded at slow logging speeds. That is, the effective resolution after deconvolution may exceed intrinsic resolution. Deconvolution operator elements always sum up to one (1). However, some elements may be negative and symmetry is not necessary. Owing to the nature of deconvolution, bed boundaries and peaks and valleys may be seen to shift up to one foot (uphole or downhole) afterward. Deconvolution is an operation that removes the blurring effects caused by detectors with finite lengths and finite source-to-detector spacings. Inherent in the deconvolution operators, because of their derivation through empirical means, is consideration for such variables as source and detector positions, detector lengths, collimation and information about gamma ray and neutron transport and absorption in earth formations.

Figure 7:
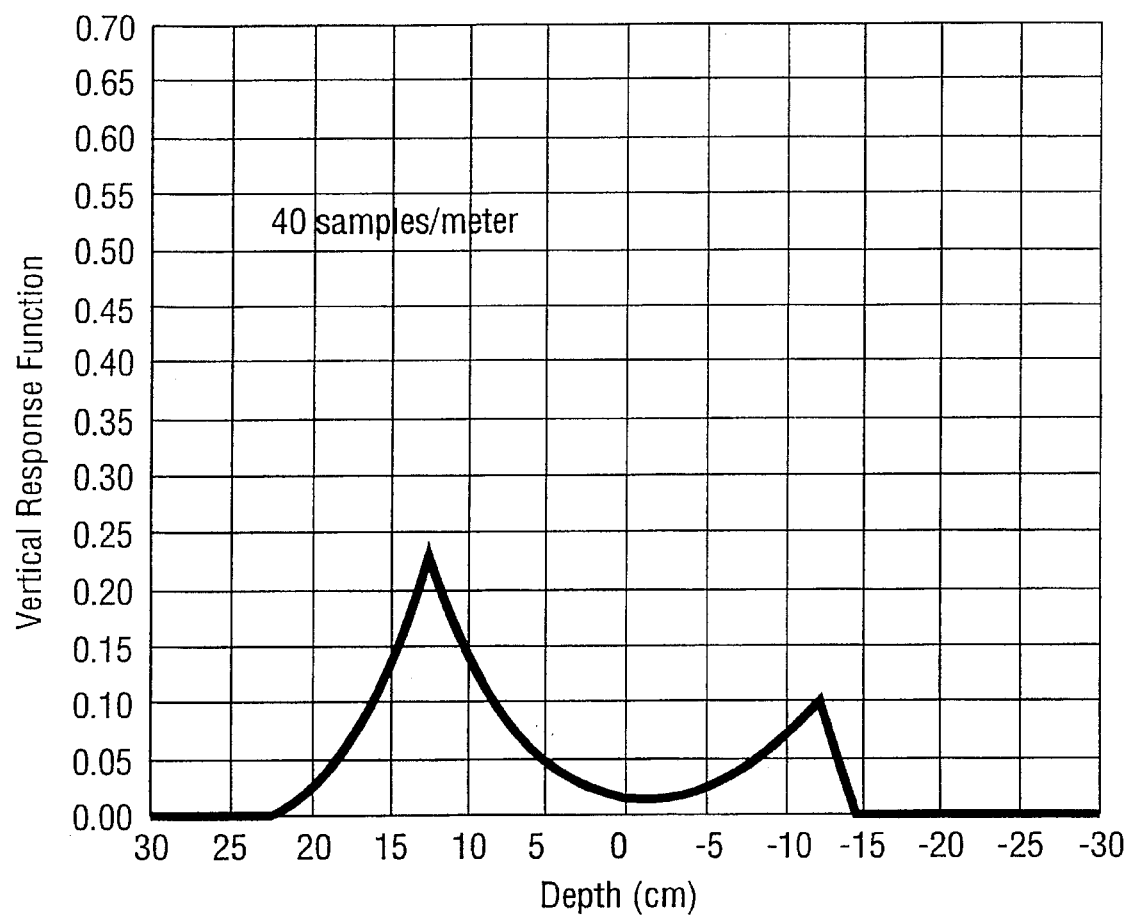
FIG. 7 shows the vertical response function (filter) used to derive the Van Cittert deconvolution operator in the flow chart of FIG. 6 and as depicted in FIG. 8.
Figure 8:
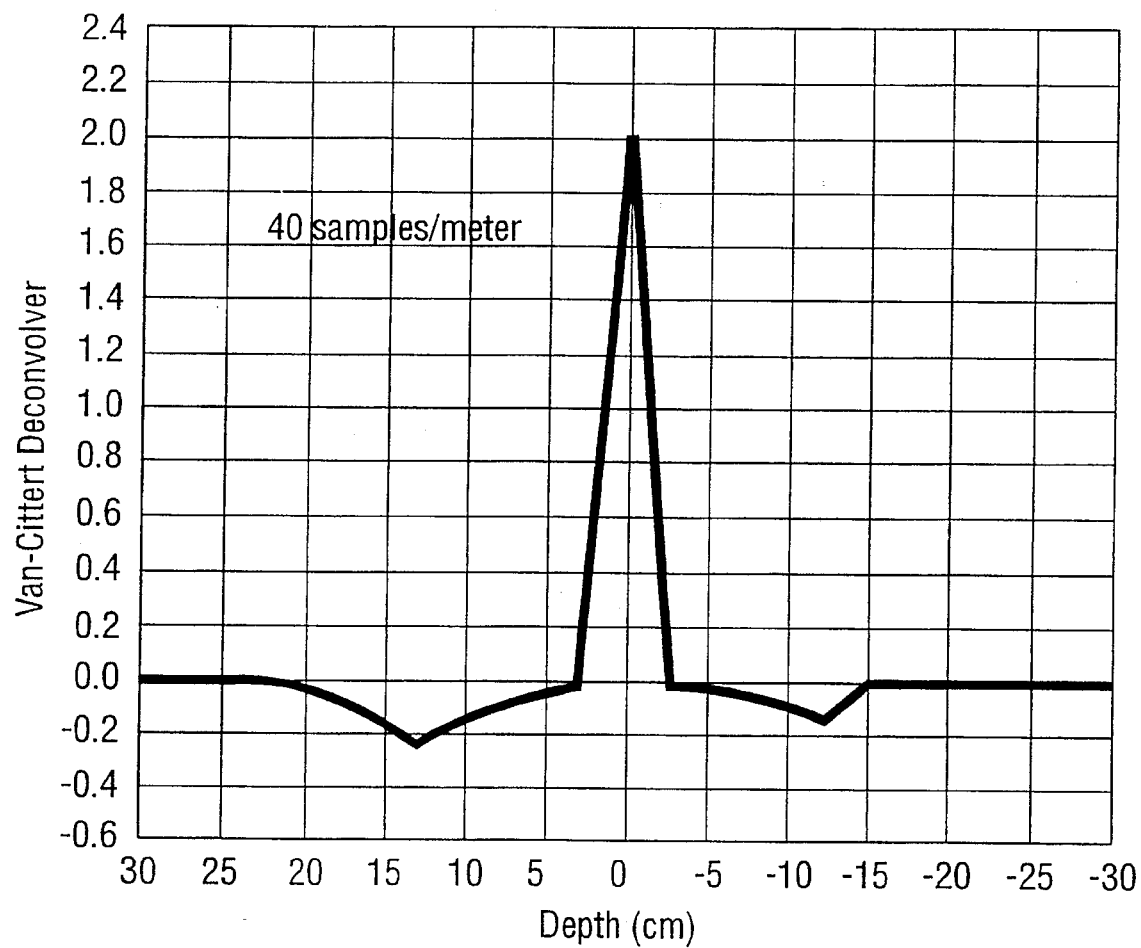
FIG. 8 is the Van Cittert deconvolution operator of the flow chart of FIG. 6, corresponding to the vertical response function of FIG. 7.
Figure 9:
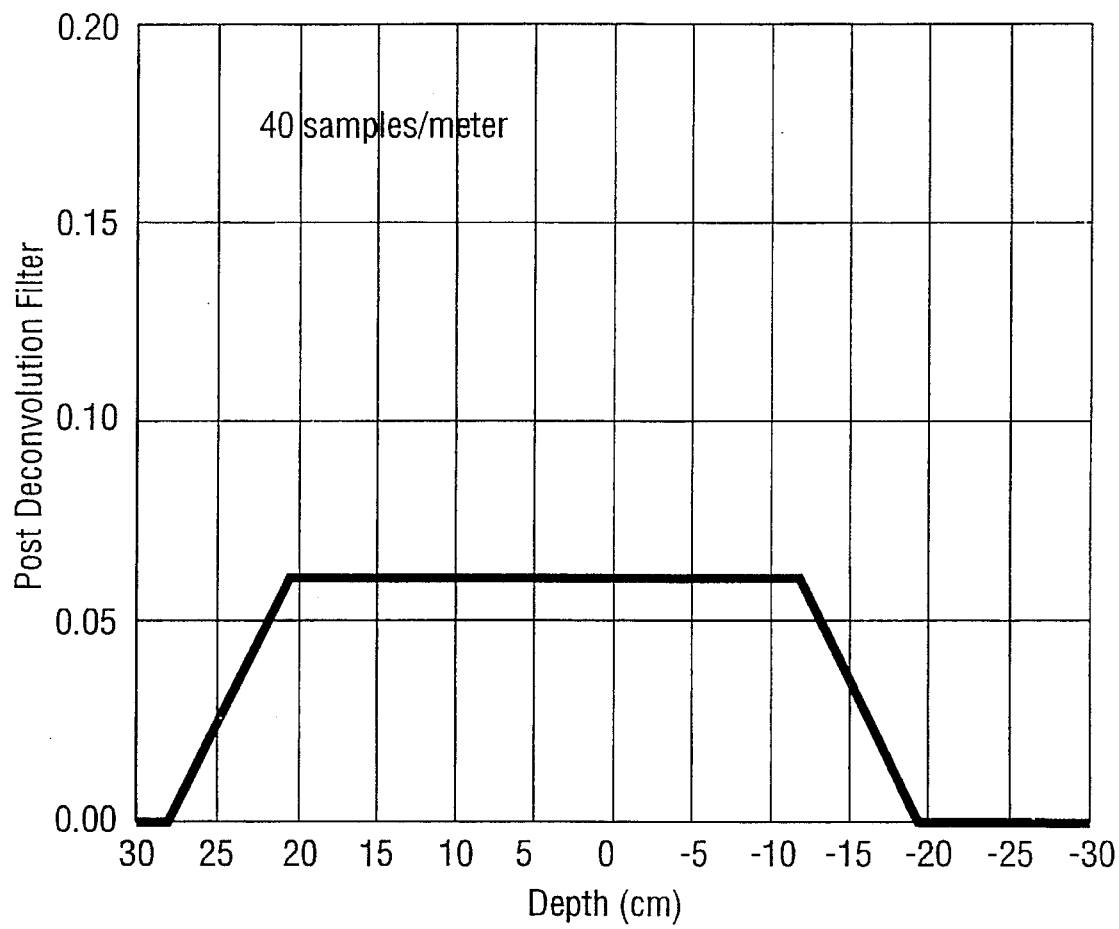
FIG. 9 is the post deconvolution filter used in the enhanced vertical processing.

FIG. 7 shows the vertical response function, as developed through the use of test tank data, of the long detector, which is the same as that for $\Delta\bar{\rho}_{SHORT}$. The peaks of the vertical response function correspond to the positions of the source and detector. Thus, it is apparent that the material opposite the source and the material opposite the detector are most important in the logging process. The material between the source and a detector is not as important. As a result, the vertical response function of FIG. 7 acts as a filter in much the same way as the filters in FIGS. 11 and 12. The actual deconvolution operator is shown in FIG. 8 and is based directly on FIG. 7. The deconvolution operator is also a filter, but a filter with some negative numbers. The negative portions correspond to the location of the source and the long detector.

A number of deconvolution algorithms have been examined and deconvolution remains an active area of research. Results obtained with the traditional Van Cittert deconvolution algorithm have been reported. In the following equation, $\Delta\bar{\rho}_{SHORT}(I)$ represents the sequence of values of $\Delta\bar{\rho}_{SHORT}$ that is a function of the depth-aligned and materially matched short and long density measurements:

$$\Delta\bar{\rho}_{SHORT}(-2), \Delta\bar{\rho}_{SHORT}(-1), \Delta\bar{\rho}_{SHORT}(0) \Delta\bar{\rho}_{SHORT}(+1), \Delta\bar{\rho}_{SHORT}(+2), \quad (10)$$

These are observed/recorded values, i.e., the true vertical response function has already been applied by nature as the tool moved through the well borehole and responded to the beds that are present. The Van Cittert deconvolution algorithm begins by applying the VRF (FIG. 8) to these values as if they were now the beds, so that a sequence of convolved values is obtained:

$$CONVOLVED \Delta\bar{\rho}_{SHORT}(I) = \sum_{J=-L}^{+L} VRF(J) \cdot \Delta\bar{\rho}_{SHORT}(I+J), \quad (11)$$

where L is large enough to accomodate the VRF (FIG. 8).

The key assumption of this algorithm is that the shift that is computed between the observed values ($\Delta\bar{\rho}_{SHORT}(I)$) and the convolved values (convolved $\Delta\bar{\rho}_{SHORT}(I)$) is the same in magnitude, but opposite in sign, to that obtained when the beds were originally convolved to produce the recorded/computed values ($\Delta\bar{\rho}_{SHORT}(I)$). Thus the final expression for the deconvolved values becomes:

$$DECONVOLVED \Delta\bar{\rho}_{SHORT}(I) = 2\Delta\bar{\rho}_{SHORT}(I) - \quad (12)$$

$$\sum_{J=-L}^{+L} VRF(J) \cdot \Delta\bar{\rho}_{SHORT}(I+J)$$

Therefore, a filter which accomplished the Van Cittert deconvolution algorithm in one step from the original log data is simply:

$$-VRF(-L), -VRF(-L+1), \ldots, -VRF(-1), 2-VRF(0), -VRF(+1), \ldots, -VRF(+L-1), -VRF(+L) \quad (13)$$

Since the VRF is never negative and always less than unity, only the center deconvolution filter dement is positive.

The relationship between the vertical response function of FIG. 7 and the Van Cittert deconvolution technique as embodied in FIG. 8 is analogous to the relationship between the two, as detailed in the *Neutron Logging Application,* previously incorporated herein. However, the neutron logging vertical response function does not have the low level of response between the source and long detector as shown in FIG. 7. In the neutron logging there is no "blindspot." The result of step 1600 is an enhancement in vertical resolution. Step 1700 applies a post-deconvolution filter. This is necessitated by the inability of the deconvolution technique to determine whether a change in count rate is due to formation change, such as change in density, or to random statistical variations so common with nuclear radiation. Unlike the neutron VRF, which is a strong function of formation fluid content, the density VRF is nearly constant for all densities normally encountered in logging. Thus, the post-deconvolution filter is used to mute the results of the deconvolution. This prevents amplification of statistical anomalies.

The deconvolution/post-deconvolution filter is repeated a number of times. Experimentation has indicated that repetition of these steps four times produces acceptable results. Increased numbers of repetitions have not been found to increase the usefulness of the results enough to justify their use. Further, because of the nature of this method, the use of more iterations may, in fact, introduce other errors such as floating point errors and the inability to maintain sufficient accuracy. Another concern is the ability to maintain a logging speed of 30 feet per minute. At present, as shown in step 1800, 4 iterations appears to be the practical limit in order to obtain sufficient results. However, with the ever increasing speed of microprocessors and the like, it is anticipated that future devices could operate at 30 feet per minute while employing many more iterations of the deconvolve/filter step. Because of the strictly mathematical/statistical nature of the deconvolve/filter steps, it is conceivable to develop a filter, or mathematical equation, that would allow the iterative deconvolve/filter process to be combined into a one step, multi-operand, equation. At present, it is not believed that this provides any significant operational benefit. It will be appreciated by those skilled in the art that the successive application of the deconvolver in steps 1600 and 1700 includes a telescoping-like operation. That is, since the deconvolver has a finite length, fewer and fewer elements in the sequence (10) are involved in each successive iteration, ie. the involved values shrink from each end. This is a normal occurence in digital signal processing.

Figure 10:
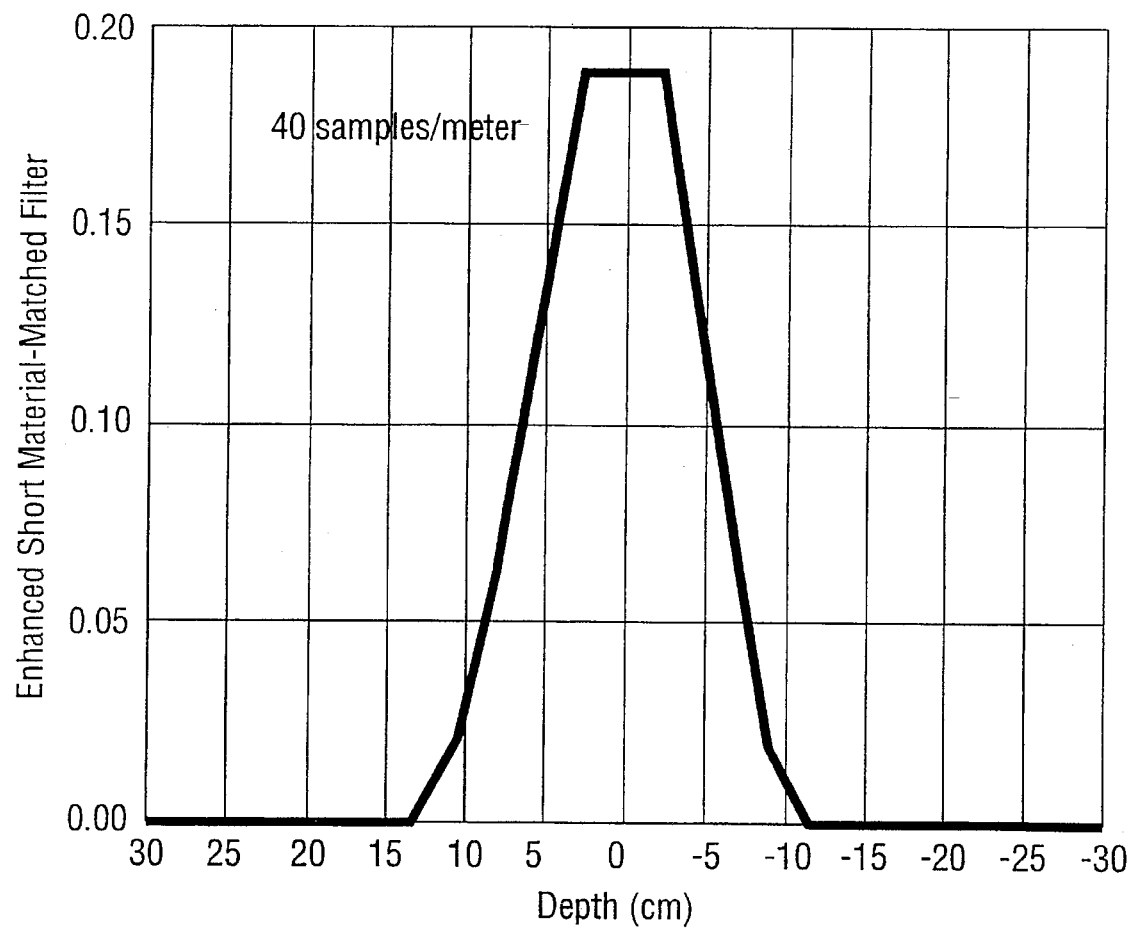
FIG. 10 is an exemplary filter for use on short detector measurements for material matching during enhanced processing.

After step 1800, an enhanced or higher vertical resolution, $\Delta \hat{\rho}_{SHORT}$ has been computed. In step 1900, the unfiltered, calibrated short density measurements computed in step 900 are used in conjunction with an enhanced material matching filter as shown in FIG. 10. The filtering performed in step 1900 is less severe than that of step 1100. This allows proper material matching for the enhanced processing. The enhanced short-spaced filter (FIG. 10) is empirically obtained—it materially matches the deconvolved $\Delta \hat{\rho}_{SHORT}$.

The final step, step 2000 is the simple computation of $\rho_B$ from $\hat{\rho}_{SHORT}$ and $\Delta \hat{\rho}_{SHORT}$, that is $\hat{\rho}_B = \hat{\rho}_{SHORT} + \Delta \hat{\rho}_{SHORT}$. Since the original curve being deconvolved, $\Delta \hat{\rho}_{SHORT}$, is a function of both short- and long-spaced count rates, the final deconvolved curve, $\Delta \hat{\rho}_{SHORT}$ is also.

As can be seen from a comparison of FIGS. 10 and 11, the enhanced processing results in a much finer vertical resolution. The filter of FIG. 10 cannot be further refined, or narrowed, without risking inaccuracy due to improper frequency and/or material matching. This would result in over-reliance on the short detector, a flaw practiced in the prior art.

What is claimed is:

1. A method for determining the density of earth formations with enhanced vertical resolution comprising the steps of:
    (a) moving a logging tool through a well borehole that penetrates at least one formation, wherein the logging tool includes a source of gamma rays and at least two detectors that measure the gamma rays scattered by the at least one formation and wherein said detectors are spaced from the source by different distances;
    (b) measuring count rate responses from said detectors as a function of tool depth while moving the logging tool through said borehole and computing a density measurement from at least one of said detectors;
    (c) depth aligning and filtering said count rate responses to produce at least two count rate inputs for a compensated formation density computation;
    (d) computing a value of compensated formation density and formation density correction from at least two of said count rate inputs according to a predetermined relationship;
    (e) computing a detector vertical response function according to a second predetermined relationship;
    (f) deconvolving said formation density correction for one of said detectors from said compensated formation density measurement from step (d) by using said vertical response function and according to a third predetermined relationship to obtain a deconvolved formation density correction with enhanced vertical resolution; and
    (g) combining said deconvolved formation density correction and one of said computed density measurements from (b) according to a fourth predetermined relationship to compute a compensated formation density with enhanced vertical resolution.

2. The method of claim 1, wherein at step (b) said count rates are measured at least two times per foot.

3. The method of claim 1 wherein at step (c) said depth aligning and filtering involve at least in part material matching of said inputs.

4. The method of claim 1 wherein at step (d) said computing a value of compensated formation density involves at least in part applying a standard tool calibration.

5. The method of claim 1 wherein at step (d) said computing a value of compensated formation density involves at least in part correcting for variations in borehole size and tool standoff.

6. The method of claim 1 wherein at step (d) said computing a value of compensated formation density involves at least in part smoothing such that said density has relatively good precision and repeatability.

7. The method of claim 1 wherein at step (f) said third predetermined relationship involves at least in part prefiltering said formation density correction for one of said detectors from said compensated formation density measurement from (d) prior to the deconvolving operation.

8. The method of claim 1 wherein at step (f) said deconvolving formation density correction for one of said detectors from said compensated formation density measurement from (d) involves at least in part responses for that detector from step (b) measured at least at three different tool positions while moving the logging tool through said borehole.

9. A method for determining the density of earth formations with enhanced vertical resolution comprising the steps of:
    (a) moving a logging tool through a well borehole that penetrates at least one formation, wherein the logging tool includes a source of gamma rays and at least two detectors that measure the gamma rays scattered by the at least one formation and wherein said detectors are spaced from the source by different distances;
    (b) measuring count rate responses from said detectors as a function of tool depth while moving the logging tool through said borehole and computing a density measurement from at least one of said detectors;
    (c) depth aligning and filtering said count rate responses to produce at least two count rate inputs for a compensated formation density computation;
    (d) computing a value of compensated formation density and formation density correction from at least two of said count rate inputs according to a predetermined relationship, and wherein said computing a value of compensated formation density involves at least in part correcting for variations in borehole size and tool standoff;
    (e) computing a detector vertical response function according to a second predetermined relationship;
    (f) deconvolving said formation density correction for one of said detectors from said compensated formation density measurement from step (d) by using said vertical response function and according to a third predetermined relationship to obtain a deconvolved formation density correction with enhanced vertical resolution; and (g) combining said deconvolved formation density correction and one of said computed density measurements from (b) according to a fourth predetermined relationship to compute a compensated formation density with enhanced vertical resolution.

10. The method of claim 9 wherein at step (c) said depth aligning and filtering involve at least in part material matching of said inputs.

11. The method of claim 9 wherein at step (d) said computing a value of compensated formation density involves at least in part applying a standard tool calibration.

12. The method of claim 9 wherein at step (d) said computing a value of compensated formation density involves at least in part smoothing such that said density has relatively good precision and repeatability.

13. The method of claim 9 wherein at step (f) said third predetermined relationship involves at least in part prefiltering said formation density correction for one of said detectors from said compensated formation density measurement from (d) prior to the deconvolving operation.

14. The method of claim 9 wherein at step (f) said deconvolving a formation density correction for one of said detectors from said compensated formation density measurement from (d) involves at least in part responses for that detector from step (b) measured at least at three different tool positions while moving the logging tool through said borehole.

15. A method for determining the density of earth formations with enhanced vertical resolution comprising the steps of:

(a) moving a logging tool through a well borehole that penetrates at least one formation, wherein the logging tool includes a source of gamma rays and at least two detectors that measure the gamma rays scattered by the at least one formation and wherein said detectors are spaced from the source by different distances;

(b) measuring count rate responses from said detectors as a function of tool depth while moving the logging tool through said borehole and computing a density measurement from at least one of said detectors;

(c) depth aligning and filtering said count rate responses to produce at least two count rate inputs for a compensated formation density computation;

(d) computing a value of compensated formation density and formation density correction from at least two of said count rate inputs according to a predetermined relationship;

(e) computing a detector vertical response function according to a second predetermined relationship;

(f) deconvolving said formation density correction for one of said detectors from said compensated formation density measurement from step (d) by using said vertical response function and according to a third predetermined relationship to obtain a deconvolved formation density correction with enhanced vertical resolution, and wherein said third predetermined relationship involves at least in part prefiltering said short detector count rate response from (b) prior to the deconvolving operation; and (g) combining said deconvolved formation density correction and one of said computed density measurements from (b) according to a fourth predetermined relationship to compute a compensated formation density with enhanced vertical resolution.

16. The method of claim 15 wherein at step (c) said depth aligning and filtering involve at least in part material matching of said inputs.

17. The method of claim 15 wherein at step (d) said computing a value of compensated formation density involves at least in part applying a standard tool calibration.

18. The method of claim 15 wherein at step (d) said computing a value of compensated formation density involves at least in part smoothing such that said density has relatively good precision and repeatability.

19. The method of claim 15 wherein at step (f) said deconvolving a formation density correction for one of said detectors from said compensated formation density measurement from (d) involves at least in part responses for that detector from step (b) measured at least at three different tool positions while moving the logging tool through said borehole.

20. A method for determining the density of earth formations with enhanced vertical resolution comprising the steps of:

(a) moving a logging tool through a well borehole that penetrates at least one formation, wherein the logging tool includes a source of gamma rays and at least two detectors that measure the gamma rays scattered by the at least one formation and wherein said detectors are spaced from the source by different distances;

(b) measuring count rate responses from said detectors as a function of tool depth while moving the logging tool through said borehole and computing a density measurement from at least one of said detectors;

(c) depth aligning and filtering said count rate responses to produce at least two count rate inputs for a compensated formation density computation;

(d) computing a value of compensated formation density and formation density correction from at least two of said count rate inputs according to a predetermined relationship;

(e) computing a detector vertical response function according to a second predetermined relationship;

(f) deconvolving said formation density correction for one of said detectors from said compensated formation density measurement from step (d) by using said vertical response function and according to a third predetermined relationship to obtain a deconvolved formation density correction with enhanced vertical resolution, and wherein said deconvolving a short detector count rate response involves at least in part responses for that detector from step (b) measured at least at three different tool positions while moving the logging tool through said borehole; and (g) combining said deconvolved formation density correction and one of said computed density measurements from (b) according to a fourth predetermined relationship to compute a compensated formation density with enhanced vertical resolution.

21. The method of claim 20 wherein at step (c) said depth aligning and filtering involve at least in part material matching of said inputs.

22. The method of claim 20 wherein at step (d) said computing a value of compensated formation density involves at least in part applying a standard tool calibration.

23. The method of claim 20 wherein at step (d) said computing a value of compensated formation density involves at least in part correcting for variations in borehole size and tool standoff.

24. The method of claim 20 wherein at step (d) said computing a value of compensated formation density involves at least in part smoothing such that said density has relatively good precision and repeatability.

25. The method of claim 20 wherein at step (f) said third predetermined relationship involves at least in part prefiltering said formation density correction for one of said detectors from said compensated formation density measurement from (d) prior to the deconvolving operation.

26. The method of claim 1 wherein at step (d) said formation density correction is a short detector formation density correction.

27. The method of claim 26 wherein at step (f) said formation density correction for one of said detectors from said compensated formation density measurement is a short detector formation density correction.

28. The method of claim 9 wherein at step (d) said formation density correction is a short detector formation density correction.

29. The method of claim 28 wherein at step (f) said formation density correction for one of said detectors from said compensated formation density measurement is a short detector formation density correction.

30. The method of claim 15 wherein at step (d) said formation density correction is a short detector formation density correction.

31. The method of claim 30 wherein at step (f) said formation density correction for one of said detectors from said compensated formation density measurement is a short detector formation density correction.

32. The method of claim 20 wherein at step (d) said formation density correction is a short detector formation density correction.

33. The method of claim 32 wherein at step (f) said formation density correction for one of said detectors from said compensated formation density measurement is a short detector formation density correction.

* * * * *